US009996132B2

United States Patent
Otomo et al.

(10) Patent No.: US 9,996,132 B2
(45) Date of Patent: Jun. 12, 2018

(54) DISTRIBUTED PROCESSING METHOD, SYSTEM, AND COMPUTER PRODUCT

(71) Applicant: FUJITSU LIMITED, Kawasaki-shi, Kangawa (JP)

(72) Inventors: Toshiya Otomo, Kawasaki (JP); Koichiro Yamashita, Hachioji (JP); Takahisa Suzuki, Yokohama (JP); Hiromasa Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 14/997,545

(22) Filed: Jan. 17, 2016

(65) Prior Publication Data

US 2016/0132088 A1   May 12, 2016

Related U.S. Application Data

(63) Continuation of application No. PCT/JP2013/069567, filed on Jul. 18, 2013.

(51) Int. Cl.
*G06F 1/26* (2006.01)
*G06F 9/50* (2006.01)
*H04L 12/733* (2013.01)

(52) U.S. Cl.
CPC .......... *G06F 1/266* (2013.01); *G06F 9/5094* (2013.01); *H04L 45/20* (2013.01); *Y02D 10/22* (2018.01)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS

| 2009/0063879 A1* | 3/2009 | Kawamoto ....... H04W 52/0225 |
| | | 713/310 |
| 2013/0124883 A1* | 5/2013 | Addepalli ................ G06F 1/28 |
| | | 713/310 |

FOREIGN PATENT DOCUMENTS

| JP | 2004-030023 | 1/2004 |
| JP | 2010-231295 | 10/2010 |

(Continued)

OTHER PUBLICATIONS

Yoshida et al., "Data Collection Protocols for Energy Harvesting Sensor Networks", Information Processing Society Journal, Journal of Information Processing (CD-ROM), Information Processing Society of Japan, Mar. 15, 2011, vol. 52, No. 3, pp. 997-1009. Cited in JP-OA dated Oct. 11, 2016 for corresponding Japanese Application No. 2015-527115.

(Continued)

*Primary Examiner* — Zahid Choudhury
(74) *Attorney, Agent, or Firm* — Fujitsu Patent Center

(57) ABSTRACT

A distributed processing method of a system in which communications apparatuses communicate data by multi-hop communication is executed by a given communications apparatus among the communications apparatuses. According to the method, the given communications apparatus executes a given process based on a result of a first process executed by a first communications apparatus that among the communications apparatuses, communicates directly with the given communications apparatus and operates using power stored in a charging device charged by power generated from energy obtained corresponding to an environment where installed. The given communications apparatus executes the given process when receiving the result of the first process from the first communications apparatus. The given communications apparatus further determines whether a given period has elapsed since receiving the result of the (Continued)

first process, and transmits a result of the given process to the first communications apparatus when determining that the given period has elapsed.

7 Claims, 15 Drawing Sheets

(58) Field of Classification Search
CPC ....... G06F 1/3289; G06F 1/266; H04L 12/12; H04L 12/10
See application file for complete search history.

(56) References Cited

FOREIGN PATENT DOCUMENTS

| | | |
|---|---|---|
| JP | 2012-212390 | 11/2012 |
| JP | 2013-137671 | 7/2013 |

OTHER PUBLICATIONS

JPOA—Office Action of Japanese Patent Application No. 2015-527115 dated Oct. 11, 2016, with partial English translation of the relevant part, p. 1, line 17 to p. 2, line 20 of the Office Action.
TWOA Office Action of Taiwan Patent Application 103119498 dated Jul. 30, 2015, with partial English translation (15 pages).
International Search Report and Written Opinion of the International Searching Authority (Form PCT/ISA/210, Form PCT/ISA/237), mailed in connection with PCT/JP2013/069567 and dated Oct. 1, 2013, with partial English translation (5 pages).

* cited by examiner

```
struct job {
    int kind;      /* TYPE OF JOB */
    int data;      /* DATA */
    int average;   /* AVERAGE */
    int hop;       /* HOP COUNT */
}
```
601

1401

```
struct job {
    int firsttime;      /* FIRST TIME FLAG */
    int kind;           /* TYPE OF JOB */
    int data:           /* DATA */
    int average:        /* AVERAGE */
    int hop;            /* HOP COUNT */
}
```

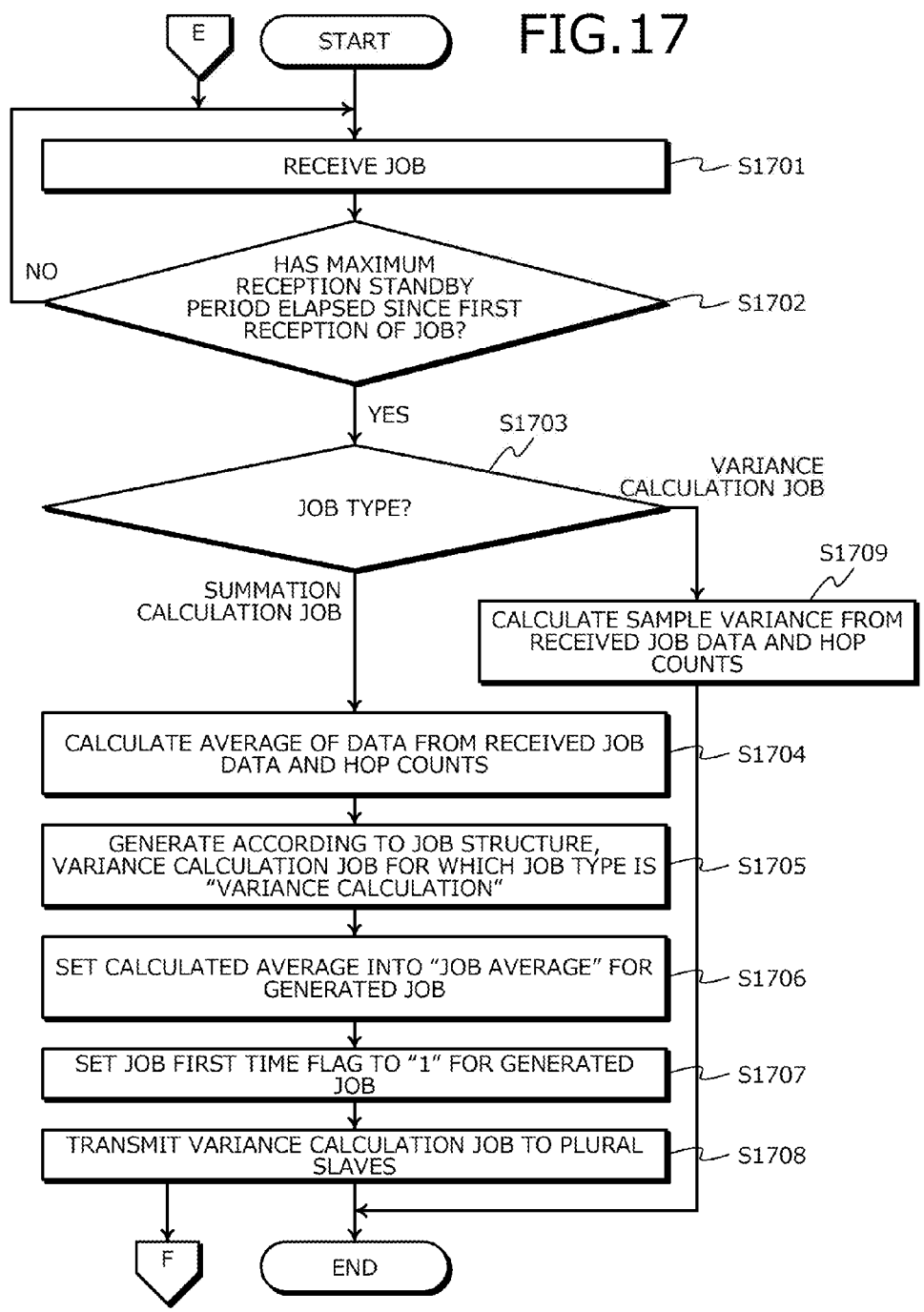

DISTRIBUTED PROCESSING METHOD, SYSTEM, AND COMPUTER PRODUCT

CROSS REFERENCE TO RELATED APPLICATIONS

This application is a continuation application of International Application PCT/JP2013/069567, filed on Jul. 18, 2013 and designating the U.S., the entire contents of which are incorporated herein by reference.

FIELD

The embodiments discussed herein are related to a distributed processing method, a system, and a computer product.

BACKGROUND

A conventional technique called energy harvesting involves generating electrical power using energy obtained corresponding to the local installation environment. Another conventional technique distributes processing among plural communications apparatuses. One related technique, for example, detects output from communications apparatuses that execute distributed processing of analysis processes, determines that a failure has occurred at a communications apparatus from which there is no output, and resumes the analysis processing by recovering the failed communications apparatus via a communications apparatus that manages the plural communications apparatuses (for example, refer to Japanese Laid-Open Patent Publication No. 2010-231295).

Nonetheless, with the conventional techniques above, when distributed processing is to be performed by communications apparatuses that operate using power generated from energy obtained corresponding the environment, the operation of a communications apparatus that executed the processing may be suspended consequent to the power being exhausted. In such instances, successive distribution of plural processes to the communications apparatuses is difficult.

SUMMARY

According to an aspect of an embodiment, a distributed processing method of a system in which plural communications apparatuses transmit and receive data by multi-hop communication, is executed by a given communications apparatus among the plural communications apparatuses. The distributed processing method including executing, by a given communications apparatus being among the plurality of communications apparatuses, a given process based on a result of a first process executed by a first communications apparatus that is among the plurality of communications apparatuses, communicates directly with the given communications apparatus, and operates using power stored in a charging device charged by power generated from energy obtained corresponding to an environment where the first communications apparatus is installed, the given communications apparatus executing the given process when receiving the result of the first process from the first communications apparatus; determining, by the given communications apparatus, whether a given period has elapsed since receiving the result of the first process; and transmitting, by the given communications apparatus, a result of the given process to the first communications apparatus when determining that the given period has elapsed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a flowchart depicting an example of a procedure of the job aggregation and reassignment process according to the second embodiment.

DESCRIPTION OF EMBODIMENTS

Embodiments of a disclosed distributed processing method, system, and distributed processing program will be described in detail with reference to the accompanying drawings.

Figure 1A:
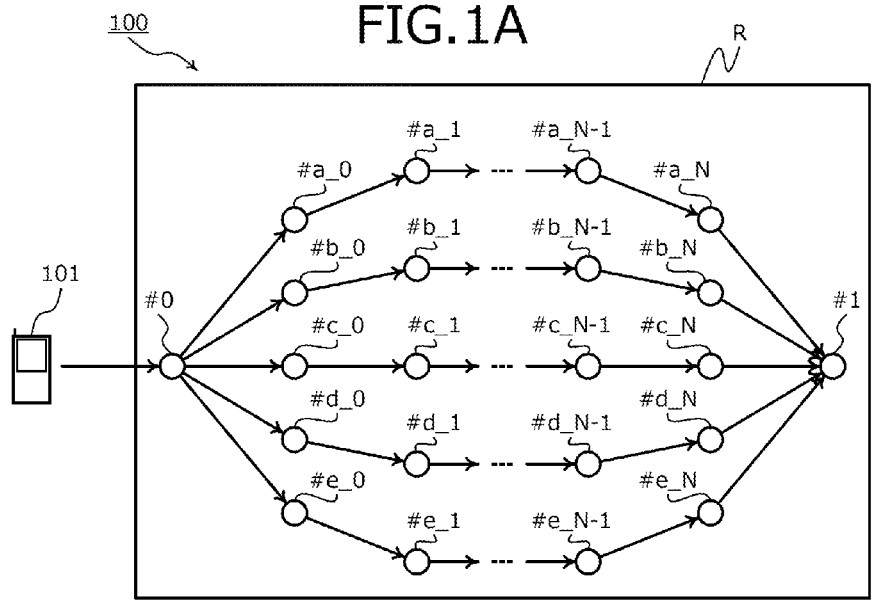
FIGS. 1A and 1B are diagrams depicting an operation example of a distributed processing method of a system according to a first embodiment.
Figure 1B:
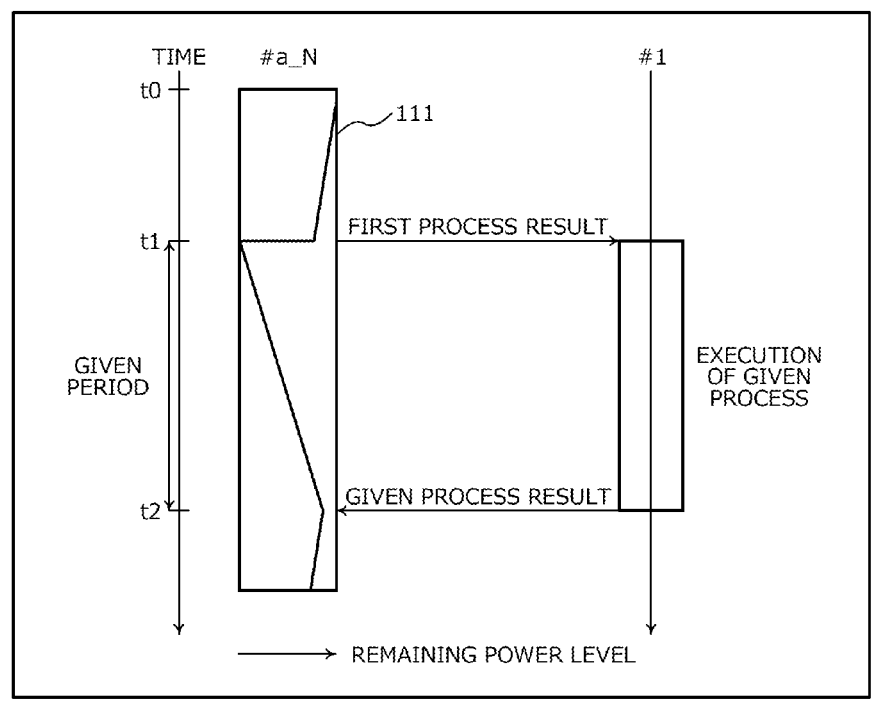

FIGS. 1A and 1B are diagrams depicting an operation example of the distributed processing method of the system according to a first embodiment. A system 100 includes an inspector terminal 101 and plural communications apparatuses. The communications apparatuses are referred to as "nodes" hereinafter. The nodes included in the system 100 include a master node, which is a specified node, and slave nodes, which are nodes other than the specified node. Hereinafter, a master node is simply called a "master". Further, a slave node is simply called a "slave". As depicted in FIG. 1A, the masters include masters #0, #1 and the slaves include slaves #a_0 to #a_N, #b_0 to #b_N, #c_0 to #c_N, #d_0 to #d_N, and #e_0 to #e_N.

Hereinafter, slaves #a_0 to #a_N, #b_0 to #b_N, #c_0 to #c_N, #d_0 to #d_N, and slaves #e_0 to #e_N will be referred to as "the slaves". Further, masters #0, #1 and the slaves will be referred to as "the nodes".

Each of the nodes is a communications apparatus that has an energy harvesting device that generates electrical power using energy obtained corresponding to the environment in which the node is installed and operates using electrical power stored by a charging unit charged with the electrical power generated by the energy harvesting device. The nodes are disposed in a given area R. The given area R, for example, is an area filled with a substance such as concrete, soil, air, etc. The nodes activate when sufficiently charged and perform intermittent operation of transmitting data and sleeping. Further, the electrical power generated by the energy harvesting device is limited and therefore, the nodes use short distance radio, which consumes minimal power, and communicate data by multi-hop communication.

The nodes communicate data by multi-hop communication along a specified communication path. The specified communication path has master #0 as a start point and master #1 as an end point. Further, when plural specified communication paths are present in the system 100, the specified communication paths share master #0 and master #1, but do not have slaves in common. The specified communication path, for example, may be determined by an algorithm that determines communication paths or by an instruction from the inspector terminal 101, etc.

As an example of an algorithm that determines communication paths, for instance, master #0 appends node identification information of master #0 to a signal and transmits the signal to a node with which direct communication is possible. A given slave that receives the signal appended with the identification information of master #0 appends the node identification information of the given slave to the received signal and transmits the signal to a node with which direct communication is possible, if the given slave has not transmitted a signal and the node identification information of the given slave is not in the received signal. The contents of the signal received by master #1 are information representing the communication path. Master #1 gives to the slaves by multi-hop communication, notification of identification information of adjacent nodes of each slave among the slaves on the communication path. The slaves store to a storage apparatus, the identification information of the adjacent nodes of each slave among the slaves on the communication path.

In the example depicted in FIG. 1A, the given area R has 5 communication paths. The first communication path is a communication path configured by master #0, slaves #a_0 to #a_N, and master #1. The second communication path is a communication path configured by master #0, slaves #b_0 to #b_N, and master #1. The third communication path is a communication path configured by master #0, slaves #c_0 to #c_N, and master #1. The fourth communication path is a communication path configured by master #0, slaves #d_0 to #d_N, and master #1. The fifth communication path is a communication path configured by master #0, slaves #e_0 to #e_N, and master #1.

The nodes may have sensors. The nodes use the respective sensors and detect the temperature, humidity, stress, etc. in the given area R. The inspector terminal 101 aggregates to a server, data related to the detection by the nodes and uses the data for analysis processing. Here, since the data is collected for each of the nodes, the data volume becomes great, placing a load on the inspector terminal 101. Therefore, the system 100 according to the first embodiment uses the computing capacity of the nodes to distribute and perform the analysis processing and thereby, facilitates a reduction of the load occurring when the inspector terminal 101 collects the data.

Nonetheless, when the analysis processing is distributed and performed by the nodes, since the nodes operate intermittently, even if the master attempts to cause a slave to execute the processing, the slave operates intermittently and consequently, assignment of processing to the slave during suspension of the slave is difficult. Here, if configuration is such that the master transmits a signal inquiring whether the slave is operating, repeated signal transmission occurs increasing the power consumption of the master. Further, if the remaining power level of plural nodes is sufficient, although distributed processing can be performed one session at a time by the nodes, the operation of each node that has transmitted the processing results for 1 session is suspended and when distribution to more than the number of the nodes is desirable, assignment of the processing is difficult.

Thus, in the system 100 according to the present embodiment, after the master receives a processing result from a given slave, the master transmits to the given slave after a given period elapses, a processing result obtained by the master. As a result, the system 100 can pass processing results during operation of the slaves, whereby slaves can be caused to execute new processing that uses processing results.

More specifically, master #0 assigns processing to the slaves. The slaves execute the processing and master #1 aggregates the processing results. Master #1 further assigns to the slaves, processing that uses the aggregated results. The slaves execute the processing and master #0 aggregates the processing results.

FIG. 1B depicts a communication sequence of slave #a_N that communicates directly with master #1 and master #1, after master #0 has assigned processing to the slaves. Further, rectangle 111 of slave #a_N represents the remaining power level of the charging unit of slave #a_N according to time points. For example, at time t0, slave #a_N is indicated to be sufficiently charged.

From time t0 to t1, slave #a_N executes a first process and transmits first process results to master #1. Here, the first process is processing assigned by master #0. A program describing the contents of the first process may be stored to a storage area of the node by the manager of the system 100 via the inspector terminal 101, after the node is disposed or after the specified communication path is determined, or may be a program that is transmitted by master #0 and enables execution of the processing contents. The contents of the first process is not limited and, for example, may include an addition process of adding data received by slave #a_N and data obtained from the sensor of slave #a_N, and a process of incrementing a hop count of the data received by slave #a_N.

At time t1, slave #a_N transmits a result of the first process to master #1 and since no power remains, suspends operation. The result of the first process, for example, is the result of the addition and the incremented hop count.

During some instance between time t1 and time t2, master #1 executes a given process based on the result of the first process. The given process is processing related to the first process. A program describing the contents of the given process, for example, may be stored to a storage area of the node by a manager of the system 100 via the inspector terminal 101, after the node is disposed or after the specified communication path is determined. The given process, for example, is a process of calculating an average from the data and hop counts of the first process.

Master #1 determines whether the given period has elapsed since receiving the result of the first process. As a determination method, for example, master #1 records the clock pulse of a given processor in master #1 when the result of the first process is received and periodically refers to the clock pulse count to determine whether the given period has elapsed.

The given period is a power charging period from the exhaustion of the remaining power of the slaves until a power level enabling operation is reached. In actuality, the length of the given period may be determined based on measurement results obtained at the time of node manufacturing, or may be determined based on the amount of power generated by the energy harvesting device when the node is installed. For example, the given period may be as short as 1 minute and as long as 10 minutes.

At time t2, if the given period has been determined to have elapsed, master #1 transmits the result of the given process to slave #a_N. As a result, slave #a_N uses the result of the given process to again execute processing. Hereinafter, the system 100 according to the first embodiment will be described with reference to FIGS. 2 to 10.

Figure 2:
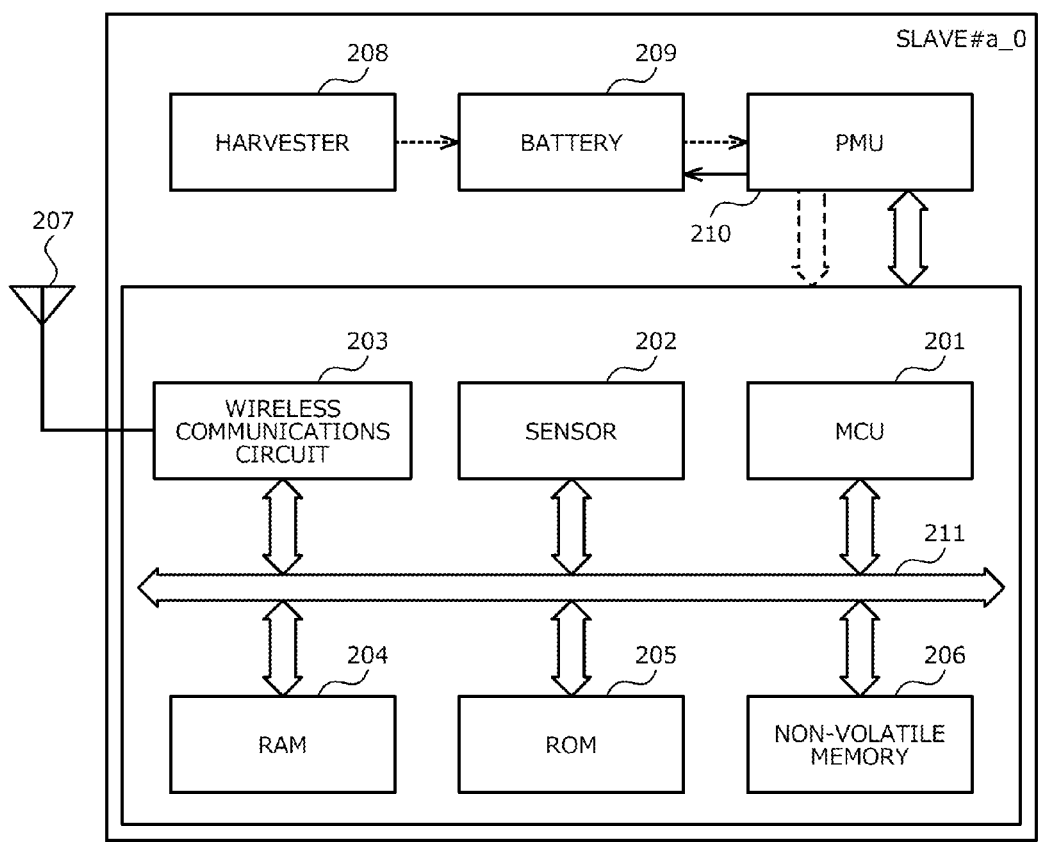
FIG. 2 is a block diagram depicting an example of hardware configuration of a node.

FIG. 2 is a block diagram depicting an example of hardware configuration of the node. In the example depicted in FIG. 2, slave #a_0 is taken as an example and hardware configuration of slave #a_0 is depicted. Other nodes including master #0, #1, slaves #a_1 to slave #a_N, slaves #b_0 to #b_N, slaves #c_0 to #c_N, slaves #d_0 to #d_N, and slaves #e_0 to #e_N have a hardware configuration identical to that of slave #a_0. Slave #a_0 has a microprocessor (hereinafter, referred to as a micro control unit (MCU)) 201, a sensor 202, a wireless communications circuit 203, random access memory (RAM) 204, read-only memory (ROM) 205, non-volatile memory 206, an antenna 207, a harvester 208, a battery 209, and a power management unit (PMU 210). Slave #a_0 further has a bus 211 that connects the MCU 201, the sensor 202, the wireless communications circuit 20, the RAM 204, the ROM 205, and the non-volatile memory 206.

The MCU 201 is a computation processing apparatus that governs overall control of slave #a_0. For example, the MCU 201 processes the data obtained by the sensor 202. The sensor 202 is an apparatus that detects a given change at the installation site. The sensor 202, for example, may be a piezoelectric device that detects voltage at the installation site, a device that detects temperature, a photoelectric device that detects light, and the like. The antenna 207 transmits and receives radio waves wirelessly communicated with the inspector terminal and/or other nodes. The wireless communications circuit 203 (radio frequency (RF)) outputs received wireless radio waves as a reception signal and transmits a transmission signal as wireless radio waves, via the antenna 207. The wireless communications circuit 203 suffices to be a communications circuit employing short range radio enabling communication with other nodes within a vicinity of several tens of centimeters.

The RAM 204 is a storage apparatus storing therein transient data of processing at the MCU 201. The ROM 205 is a storage apparatus storing therein process programs executed by the MCU 201. The non-volatile memory 206 is a rewritable storage apparatus and retains given data written thereto, even when power supply ceases. For example, flash memory and the like may be employed as the non-volatile memory 206.

The harvester 208 is the energy harvesting device described with reference to FIG. 1 and is an apparatus that generates power based on the external environment at the installation site of slave #a_0, such as, for example, energy changes in light, vibration, temperature, wireless radio waves (reception radio waves), etc. Further, the harvester 208 may generate power according to changes detected by the sensor 202. The battery 209 is an apparatus that stores the power generated by the harvester 208. In other words, slave #a_0 does not require a secondary battery or external power source and internally generates power for operation. The PMU 210 is an apparatus that controls the supply of the power stored by the battery 209, as a drive source to the components of the node.

Figure 3:
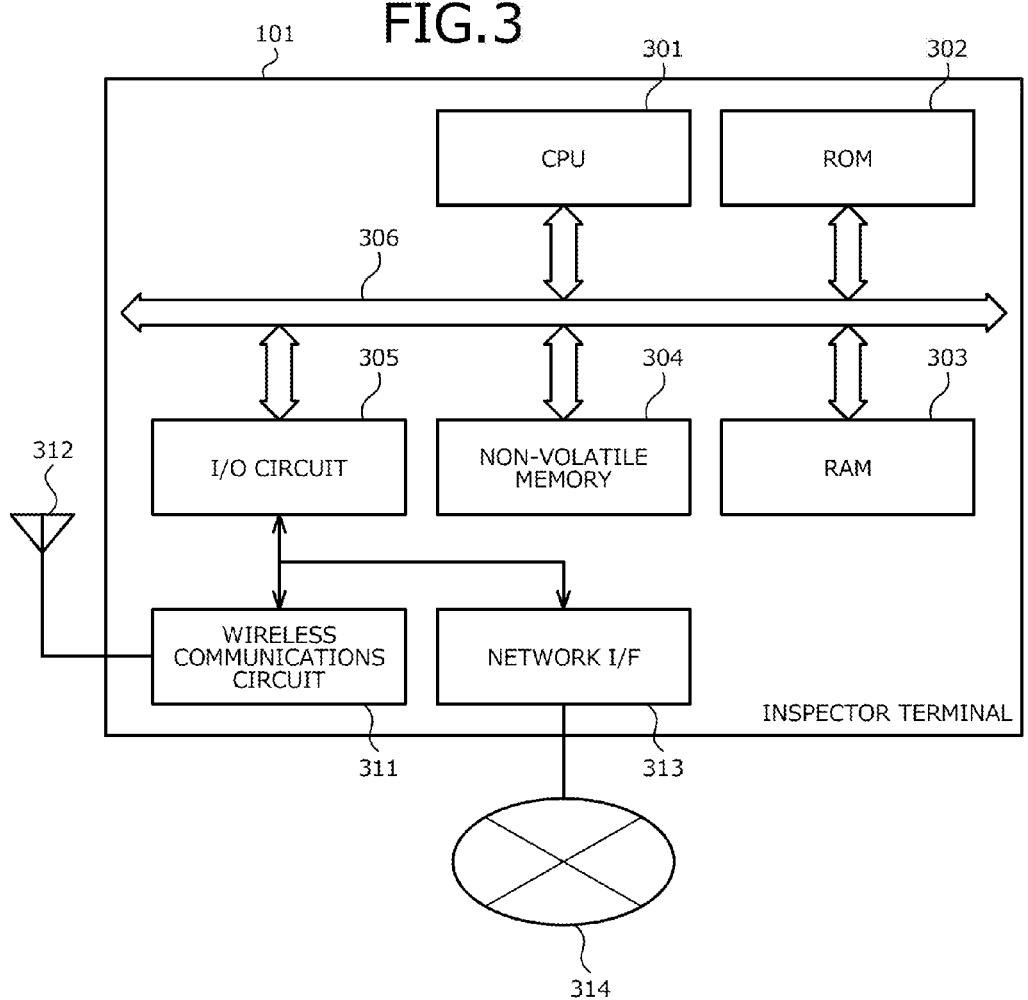
FIG. 3 is a block diagram depicting an example of hardware configuration of an inspector terminal.

FIG. 3 is a block diagram depicting an example of hardware configuration of the inspector terminal. The inspector terminal 101 has a processor (central processing unit (CPU) 301, large capacity ROM 302, RAM 303, non-volatile memory 304, an interface (input/output (I/O)) circuit 305, a wireless communications circuit 311, an antenna 312, and a network I/F 313. The CPU 301 may be more sophisticated than the MCU 201 of the nodes. The inspector terminal 101 further has a bus 306 that connects the CPU 301, the ROM 302, the RAM 303, the non-volatile memory 304, and the I/O circuit 305. The inspector terminal 101 may operate on an external power source unlike the nodes or may operate on an internal power source. The non-volatile memory 304 stores therein a node identification information list of the nodes in the system 100.

The I/O circuit 305 is connected to the wireless communications circuit 311 and the antenna 312, and to the network I/F 313. Thus, the inspector terminal 101 can wirelessly communication with the nodes, via the wireless communications circuit 311 and the antenna 312. The wireless communications circuit 311 may be a communications circuit that employs short range radio enabling communication with nodes within a vicinity of several tens of centimeters, or a communications circuit that employs intermediate range radio enabling communication with nodes at a farther distance. The inspector terminal 101, via the network I/F 313, and using an Internet Protocol (IP) process through a network 314 such as the Internet, can communicate with an external apparatus such as a server.

Figure 4:
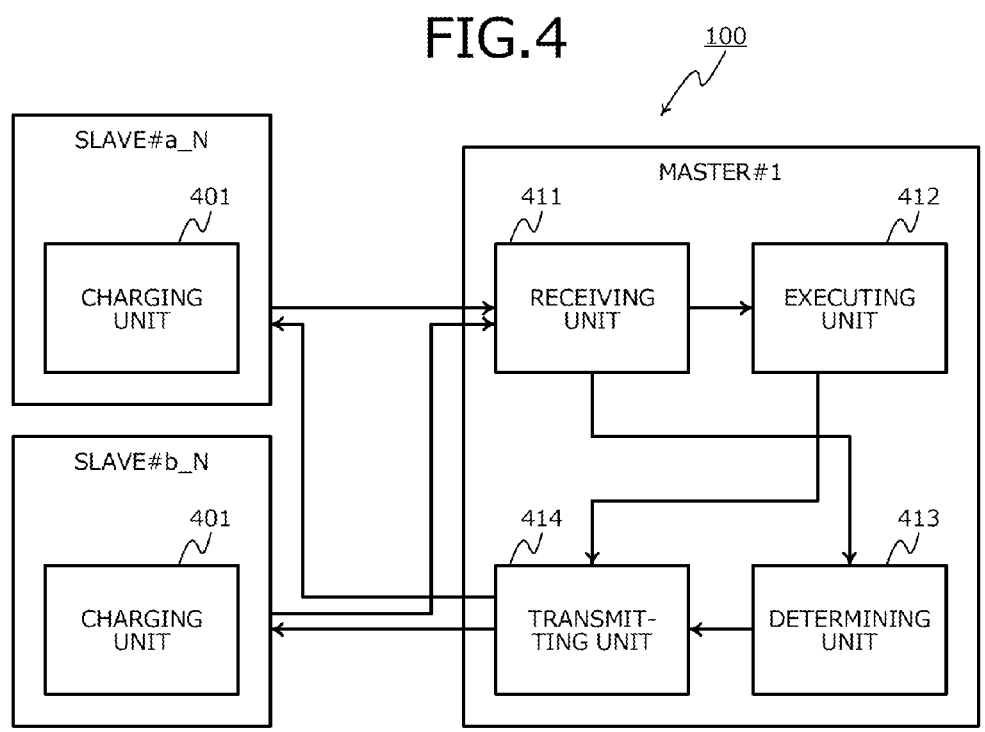
FIG. 4 is a block diagram depicting a functional example of the system according to the first embodiment.

FIG. 4 is a block diagram depicting a functional example of the system according to the first embodiment. The system 100 includes a charging unit 401, a receiving unit 411, an executing unit 412, a determining unit 413, and a transmitting unit 414. Functions of the receiving unit 411 to the transmitting unit 414 forming a control unit are realized by executing on the MCU 201, programs stored in a storage apparatus. The storage apparatus, more specifically, for example, is the ROM 205, the RAM 204, the non-volatile memory 206 depicted in FIG. 2, etc. The charging unit 401 is included in slave #a_N and slave #b_N. The charging unit 401 corresponds to the battery 209 described with reference to FIG. 2. The receiving unit 411 to the transmitting unit 414 are included in master #1.

The receiving unit 411 receives from slave #a_N, which communicates directly with master #1, a result of the first process executed by slave #a_N. Further, the receiving unit 411 receives from slave #b_N, which communicates directly with master #1, a result of a second process executed by slave #b_N. The second process, similar to the first process, is processing assigned by master #0. The received results are stored to a storage area such as the RAM 204 and the non-volatile memory 206 of master #1, etc.

The executing unit 412 executes a given process based on the result of the first process received by the receiving unit 411. Further, the executing unit 412 may execute the given process based on the result of the first process and the result of the second process, if the result of the second process is received from slave #b_N before determining that the given period has elapsed. The result of the given process is stored to a storage area such as the RAM 204 and the non-volatile memory 206 of master #1, etc.

The determining unit 413 determines whether the given period has elapsed since the receiving unit 411 received the result of the first process. Further, the determining unit 413 may determine whether the given period has elapsed since the receiving unit 411 received the result of the second process. The determination result is stored to a storage area such as the RAM 204 and the non-volatile memory 206 of master #1, etc.

The transmitting unit 414 transmits the result of the given process to slave #a_N, if the determining unit 413 has determined that the given period has elapsed since the result of the first process was received. Further, the transmitting unit 414 may transmit the result of the given process to slave #a_N, #b_N, if the determining unit 413 has determined that the given period has elapsed since the result of the second process was received. The result of the given process may be included in a new process execution request to slave #a_N.

Figure 5:
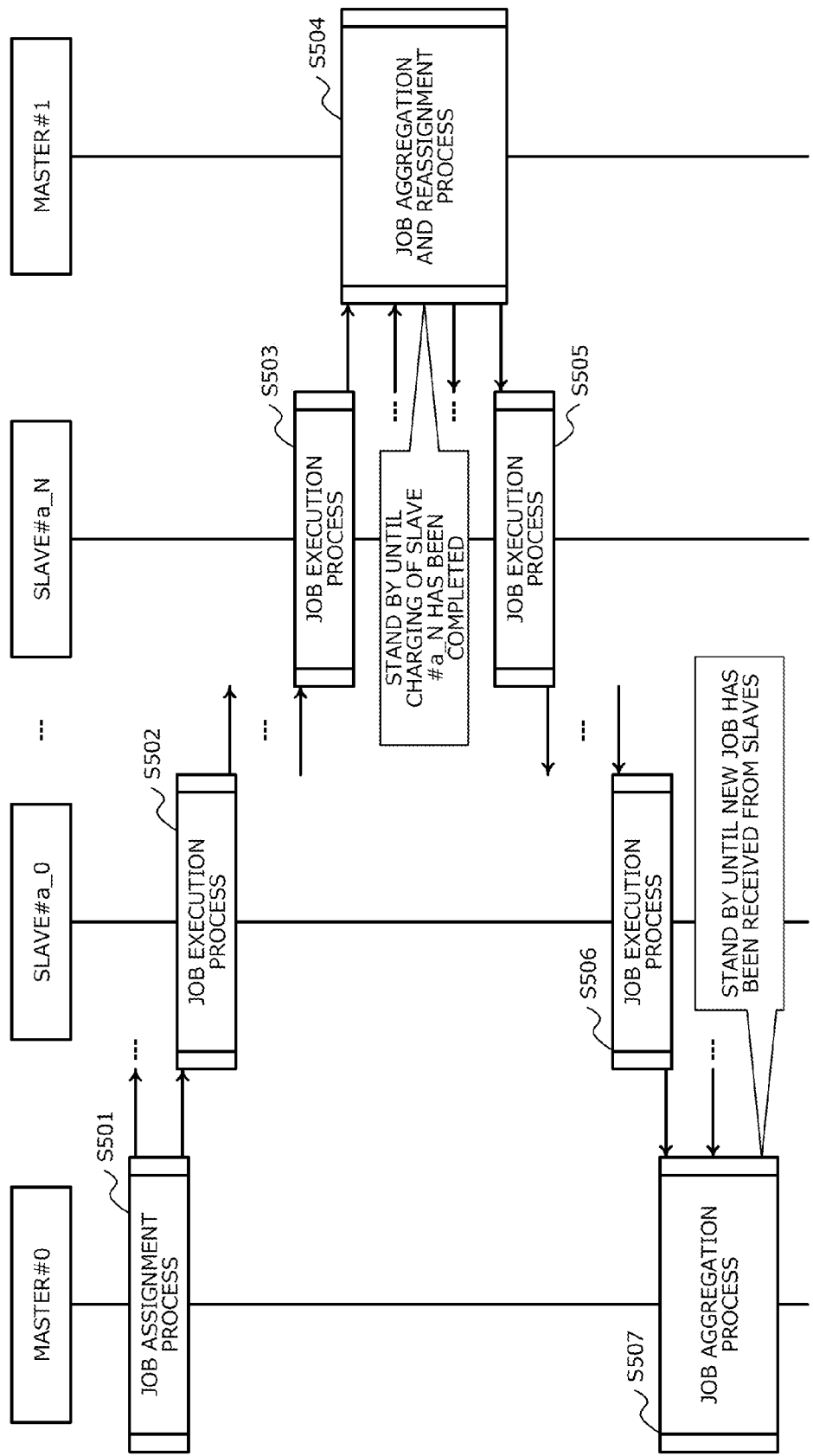
FIG. 5 is a diagram depicting a sequence of distributed processing of the nodes according to the first embodiment.

FIG. 5 is a diagram depicting a sequence of distributed processing of the nodes according to the first embodiment. In the example depicted in FIG. 5, distributed processing on a communication path configured by master #0, slave #a_0, slave #a_1, . . . , slave #a_N−1, slave #a_N, and master #1 will be described.

Master #0 executes a job assignment process according to the first embodiment (step S501). Details of the job assignment process according to the first embodiment will be described with reference to FIG. 7. Hereinafter, processing assigned to the nodes will be referred to as a job. The job assignment process is a process of generating jobs and assigning the jobs to plural slaves. Information included in a job will be described with reference to FIG. 6. In the job assignment process, master #0 transmits a job to plural slaves that include slave #a_0. More specifically, the plural slaves are assumed to include slaves #a_0, #b_0, #c_0, #d_0, and #e_0. After the transmission, master #0 has consumed power and therefore, suspends operation until charging has been completed.

Having received the job, slave #a_0 executes a job execution process (step S502). Details of the job execution process will be described with reference to FIG. 8. In the job execution process, slave #a_0 transfers the job to the subsequent node. In this manner, the job is successively transferred. After the transfer, slave #a_0 has consumed power and therefore, suspends operation until charging has been completed.

Here, the subsequent node will be described. As described with reference to FIG. 1, in the system 100, communication paths for data between the slaves are predetermined, and the slaves have stored in a storage apparatus, i.e., the non-volatile memory 206, the identification information of the two nodes with which data is communicated. The slaves receive a job from one of the two nodes identified from the identification information stored in the non-volatile memory 206 and transfer the job to the other of the two nodes as the subsequent node.

Having received the job, slave #a_N executes the job execution process (step S503). In the job execution process, slave #a_N transfers the job to master #1. After the transfer, slave #a_N has consumed power and therefore, suspends operation until charging has been completed.

Having received the job, master #1 executes a job aggregation and reassignment process (step S504). Master #1 receives the job from plural slaves including slave #a_N. More specifically, the plural slaves include slaves #a_N, #b_N, #c_N, #d_N, and #e_N. Details of the job aggregation and reassignment process will be described with reference to FIG. 9. The job aggregation and reassignment process is a process of generating a new job and assigning the new job to plural slaves after standing by until charging of slave #a_N has been completed.

When the charging of slave #a_N has been completed, the charging of master #0, slave #a_0, . . . , slave #a_N−1 has a high likelihood of also being completed. In the job aggregation and reassignment process, master #1 transmits the new job to the slaves that include slave #a_N. After the transmission, master #1 has consumed power and therefore, suspends operation until charging has been completed.

Having received the new job, slave #a_N executes the job execution process (step S505). In the job execution process, slave #a_N transfers the new job to the subsequent slave. In this manner, the new job is successively transferred. Upon receiving the new job, slave #a_0 executes the job execution process (step S506). In the job execution process, slave #a_0 transfers the new job to master #0. After the transfer, slave #a_0 has consumed power and therefore, suspends operation until charging has been completed.

Having received the new job, master #0 executes a job aggregation process (step S507). Master #0 receives the new job from plural slaves including slave #a_0. Details of the job aggregation process will be described with reference to FIG. 10. The job aggregation process is a process of standing by until the new job has been received from the slaves and collecting the received new job from the slaves.

Figures 6, 7:
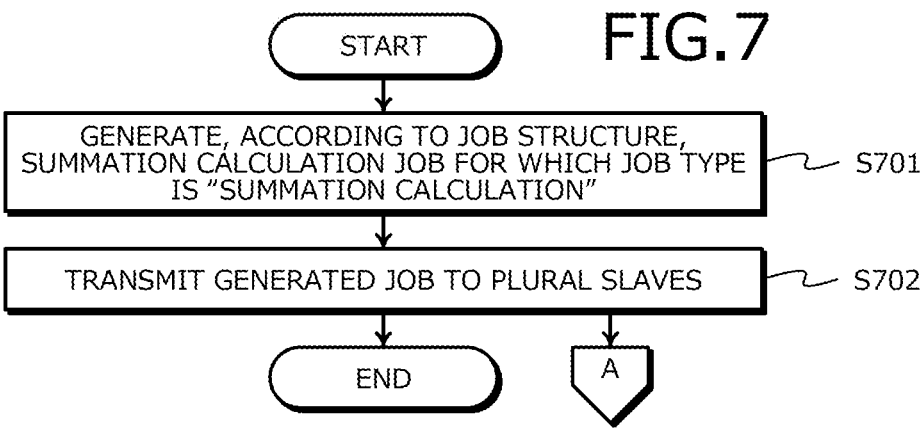
FIG. 6 is a diagram depicting one example of a job structure according to the first embodiment.
FIG. 7 is a flowchart depicting an example of a procedure of a job assignment process according to the first embodiment.

With reference to FIG. 6, a job structure defining information included in a job will be described. The system 100 according to the first embodiment and a second embodiment is assumed to be able to execute a job of calculating the variance of sensor data in the system 100. Further, to execute the job of calculating the variance, the system 100 according to the first and the second embodiment is assumed to be able to execute a job of calculating a sum of the sensor data in the system 100.

FIG. 6 is a diagram depicting one example of the job structure according to the first embodiment. A job structure 601 is program code defining information included in the job, according to the first embodiment. The job structure 601 includes 4 int-type members. The first member is a kind member storing an identifier representing the type of job. In the present embodiment, identifiers of the job type include a "summation calculation" representing the job of calculating the sum of data in the system 100 and a "variance calculation" representing the job of calculating the sample variance of the data in the system 100.

The second member is a data member that stores data that is the processing result of the job. The third member is an average member that stores an average. The fourth member is a hop member that stores a hop count, which is a transfer count of the job.

Hereinafter, to simplify description, data stored in the kind member of a job will be referred to as "job type" and the data stored in the data member of a job will be referred to as "job data". Further, data stored in the average member of a job will be referred to as "job average" and data stored in the hop member of a job will be referred to as "job hop count".

Flowcharts of the job assignment process, the job execution process, the job aggregation and reassignment process, and the job aggregation process depicted in FIG. 5 will be described with reference to FIGS. 7 to 10.

FIG. 7 is a flowchart depicting an example of a procedure of the job assignment process according to the first embodiment. The job assignment process according to the first embodiment is a process of assigning a job to plural slaves. Execution of the job assignment process is triggered by a job execution instruction from the inspector terminal 101. Alternatively, the job assignment process may be executed periodically.

Master #0 generates, according to the job structure 601, a summation calculation job for which the job type is "summation calculation" (step S701). Master #0 transmits the generated job to plural slaves (step S702). After completion of the operation at step S702, master #0 ends the job assignment process according to the first embodiment. By executing the job assignment process according to the first embodiment, master #0 assigns a job to plural slaves and enables the job to be distributed and processed in the system 100.

Figure 8:
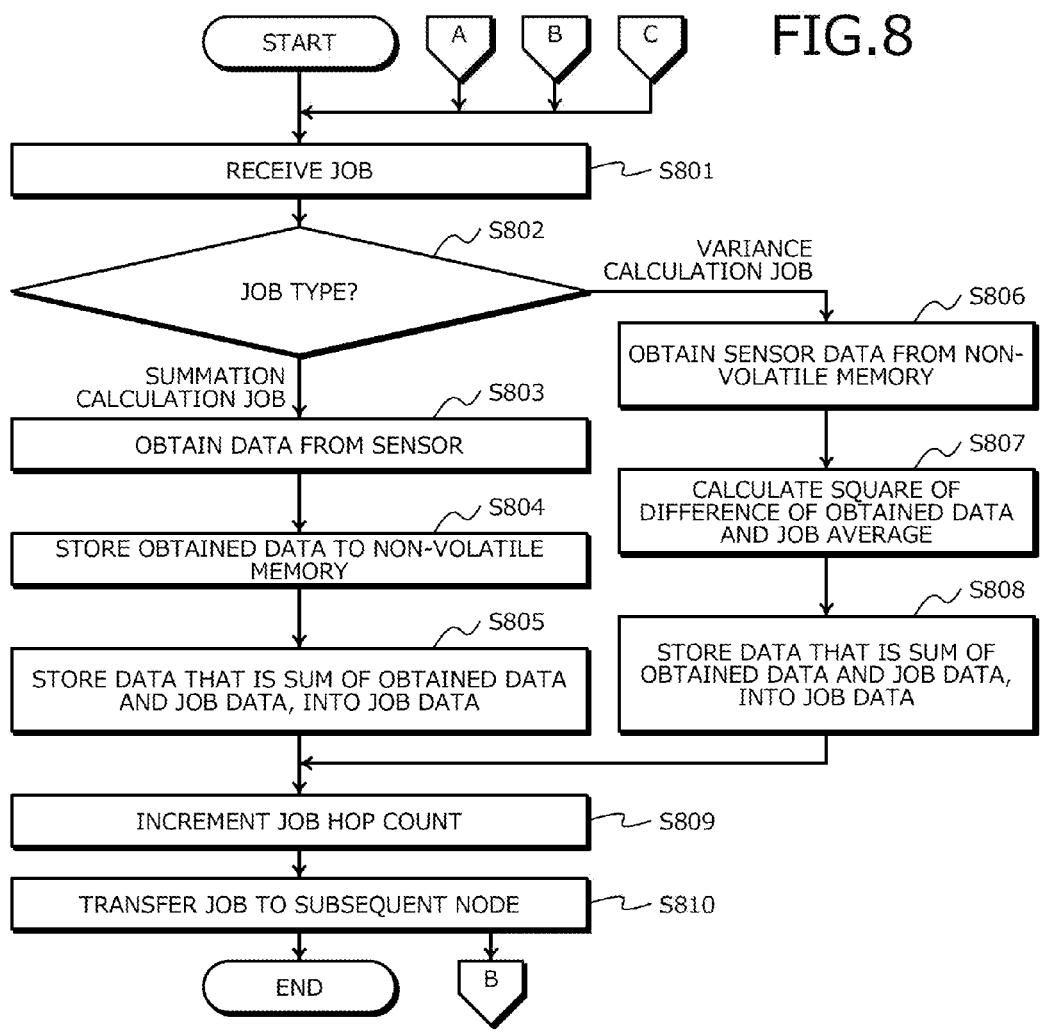
FIG. 8 is a flowchart depicting an example of a procedure of a job execution process according to the first embodiment.

FIG. 8 is a flowchart depicting an example of a procedure of the job execution process according to the first embodiment. The job execution process according to the first embodiment is a process of executing an assigned job. The job execution process is executed by each of the slaves. With respect to FIG. 8, description will be given for a case where any one of the slaves among the plural slaves executes the job execution process.

When any one of the following 3 conditions is satisfied, the slave is triggered to execute the job execution process. The first condition is represented by flowchart connector A in FIG. 8, and is a case where the slave is the subsequent node of master #0 and the operation at step S702 in FIG. 7 has been executed. The second condition is represented by flowchart connector B in FIG. 8, and is a case where the slave is the subsequent node of another slave, the job execution process has been executed by the other slave, and the operation at step S810 in FIG. 8 has been executed. The third condition is represented by flowchart connector C in FIG. 8, and is a case where the slave is the subsequent node to master #1 and the operation at step S906 in FIG. 9 has been executed.

The slave receives a job (step S801). Subsequently, the slave confirms the job type (step S802). If the job type is the summation calculation job (step S802: summation calculation job), the slave obtains data from the sensor 202 (step S803), and stores the obtained data to the non-volatile memory 304 (step S804). The slave stores data that is the sum of the obtained data and job data, into the job data (step S805).

If the job type is the variance calculation job (step S802: variance calculation job), the slave obtains data of the sensor 202 from the non-volatile memory 304 (step S806). Subsequently, the slave calculates the square of the difference of the obtained data and a job average (step S807). The slave stores data that is the sum of the obtained data and job data, into the job data (step S808).

After completing the operation at step S805 or the operation at step S808, the slave increments the job hop count (step S809), and transfers the job to the subsequent node (step S810). After completing the operation at step S810, the slave ends the job execution process according to the first embodiment. By executing the job execution process according to the first embodiment, a slave can execute an assigned job.

Figure 9:
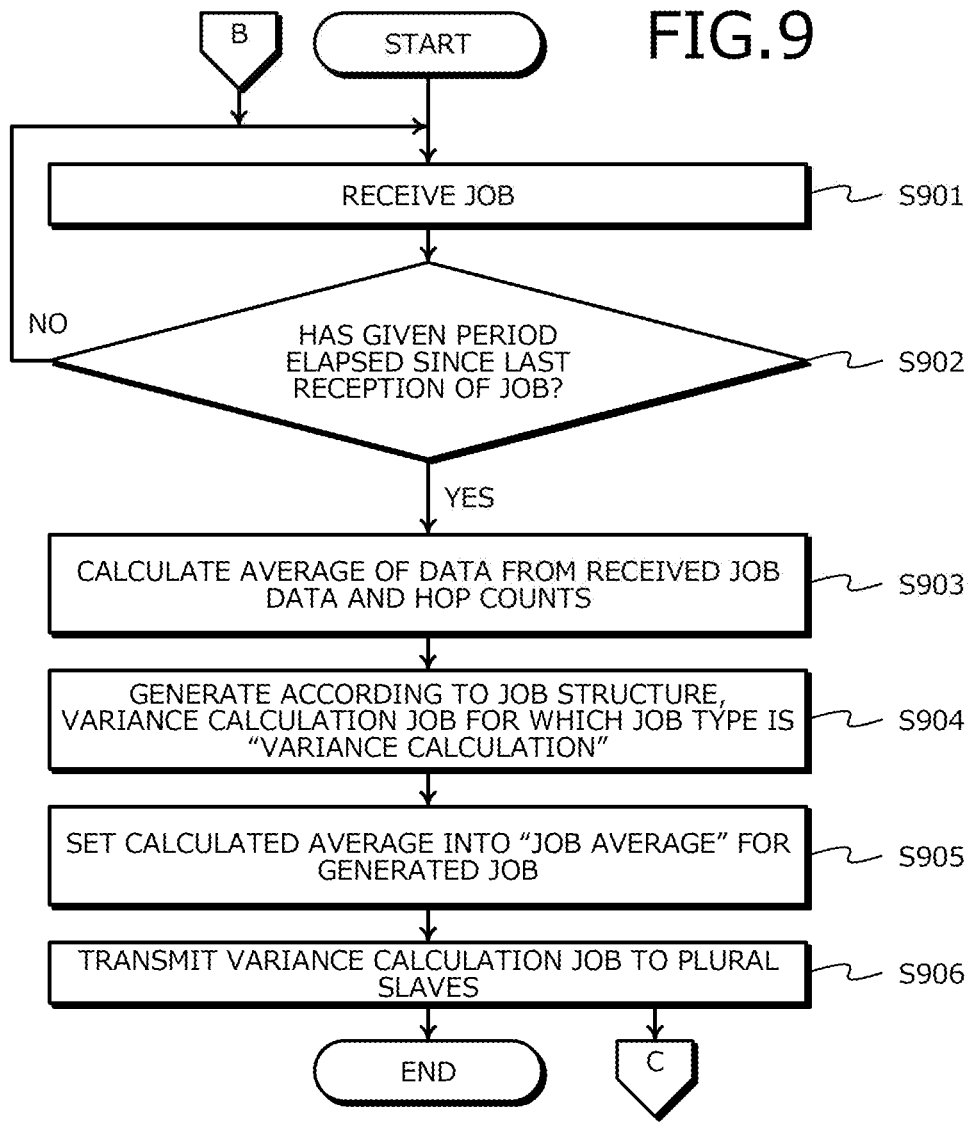
FIG. 9 is a flowchart depicting an example of a procedure of a job aggregation and reassignment process according to the first embodiment.

FIG. 9 is a flowchart depicting an example of a procedure of the job aggregation and reassignment process according to the first embodiment. The job aggregation and reassignment process according to the first embodiment is a process of aggregating a job, generating a new job, and assigning the new job to the slaves. The job aggregation and reassignment process is executed by master #1. When the operation at step S810 is executed by a slave whose subsequent node is master #1, execution of the job aggregation and reassignment process is triggered.

Master #1 receives the job (step S901). Master #1 receives the job from slaves positioned at the terminus of each communication path. Subsequently, master #1 determines whether a given period has elapsed since the last reception of the job (step S902). If the given period has not elapsed since the last reception of the job (step S902: NO), master #1 transitions to the operation at step S901.

Details of the operations at step S901 and step S902 will be described. In a case of 5 communication paths as depicted in FIG. 1, the job is received from 5 slaves. After receiving the job from a first slave, master #1 stands by until the given period elapses from the reception of the job from the first slave. While standing by, if master #1 receives the job from a second slave, master #1 stands by until the given period elapses from the reception of the job from the second slave. In this manner, master #1 receives the job from the 5 slaves.

If the job has been received from a certain extent of the slaves and the given period elapses, master #1 assumes step S902: YES and executes processing without waiting for the job to be transmitted from all the slaves. The first reason for not waiting for the job to be transmitted from all the slaves is that the nodes are low cost and installed in a large number, and consequently, nodes may have failed and the job may not be transmitted from a portion of the slaves. Further, by analyzing the job results received from a certain extent of the slaves, the user of the inspector terminal 101 can sufficiently grasp what is occurring in the given area R.

If the given period has elapsed since the last reception of the job (step S902: YES), master #1 calculates an average of the data from the received job data and hop counts (step S903). Master #1 generates according to the job structure 601, a variance calculation job for which the job type is "variance calculation" (step S904). Master #1 sets the calculated average into "job average" for the generated job (step S905). Master #1 transmits the variance calculation job to plural slaves (step S906). Here, consequent to the operation at step S902, the given period elapses from the transmission of the job by the slave that was last to transmit the job and therefore, the slaves to which the variance calculation job is to be transmitted are sufficiently charged and the likelihood that the slaves can operate is high.

After completing the operation at step S906, master #1 ends the job aggregation and reassignment process according to the first embodiment. Further, in the operation at step S902, although master #1 stands by until the given period elapses after the job is received, master #1 may execute the operations at step S903 and at step S904 while standing by. For example, when 2 jobs have been received, as an intermediate operation of the operation at step S903, master #1 may add the first and the second job hop counts and add the first and the second job data.

By executing the job aggregation and reassignment process according to the first embodiment, master #1 aggregates jobs, creates a new job, and can assign the new job to the slaves after the slaves have been sufficiently charged.

Figure 10:
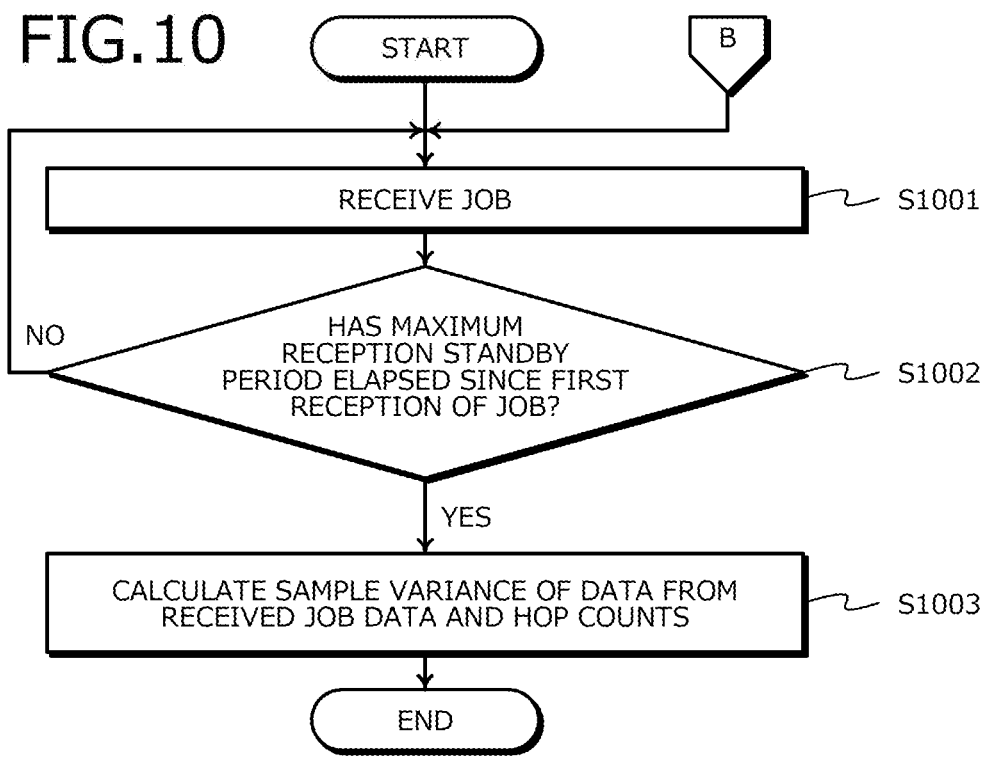
FIG. 10 is a flowchart depicting an example of a procedure of a job aggregation process.

FIG. 10 is a flowchart depicting an example of a procedure of the job aggregation process. The job aggregation process is a process of aggregating job results. Master #0 receives a job (step S1001). Subsequently, master #0 determines whether a maximum reception standby period has elapsed since the first reception of the job (step S1002). The maximum reception standby period is a period set to given some allowance in standing by such that the job can be received from plural slaves. For example, the maximum reception standby period is a few seconds. In the operation at step S1002, master #0 may determine whether the maximum reception standby period has elapsed since the last reception of the job.

If the maximum reception standby period has not elapsed since the first reception of the job (step S1002: NO), master #0 transitions to the operation at step S1001. If the maximum reception standby period has elapsed since the first reception of the job (step S1002: YES), master #0 calculates sample variance of the data from the received job data and hop counts (step S1003). After completing the operation at step S1003, master #0 ends the job aggregation process.

The job aggregation process does not include an operation of transmitting the job to other nodes. Consequently, consideration need not be given to other nodes being inoperable consequent to insufficient charging and therefore, determination of whether the given period has elapsed need not be performed. Execution of the job aggregation process enables the system 100 to obtain aggregated results of a job that is distributed and executed.

As described, according to the system 100, after a processing result is received from a slave and a given period has elapsed, another processing result is transmitted to the slave whereby, the system 100 can efficiently execute distributed processing using nodes that operate intermittently. For example, master #1 can pass a processing result to slave #a_N, without issuing a signal inquiring whether slave #a_N is operating.

Further, the system 100 gives the task of a master to each node at the terminus of a specified communication path, enabling distributed parallel processing via nodes present as slaves between the masters.

According to the system 100, after receiving the result of a given process from a given slave, if the result of another process from another slave is received before the given period has elapsed, master #1 may perform a process based on the result of the given process and the result of the other process. Consequently, master #1 can calculate a result of aggregated processing results from plural slaves.

The system 100 according to the first embodiment assumes that there are specified nodes to be masters. On the other hand, the system 100 according to the second embodiment assumes that there is 1 specified node to be a master. Hereinafter, a system 1100 according to the second embodiment will be described with reference to FIGS. 11 to 17. Portions identical to those described in the first embodiment are given the same reference numerals used in the first embodiment, and description and depiction thereof is omitted hereinafter.

Figure 11:
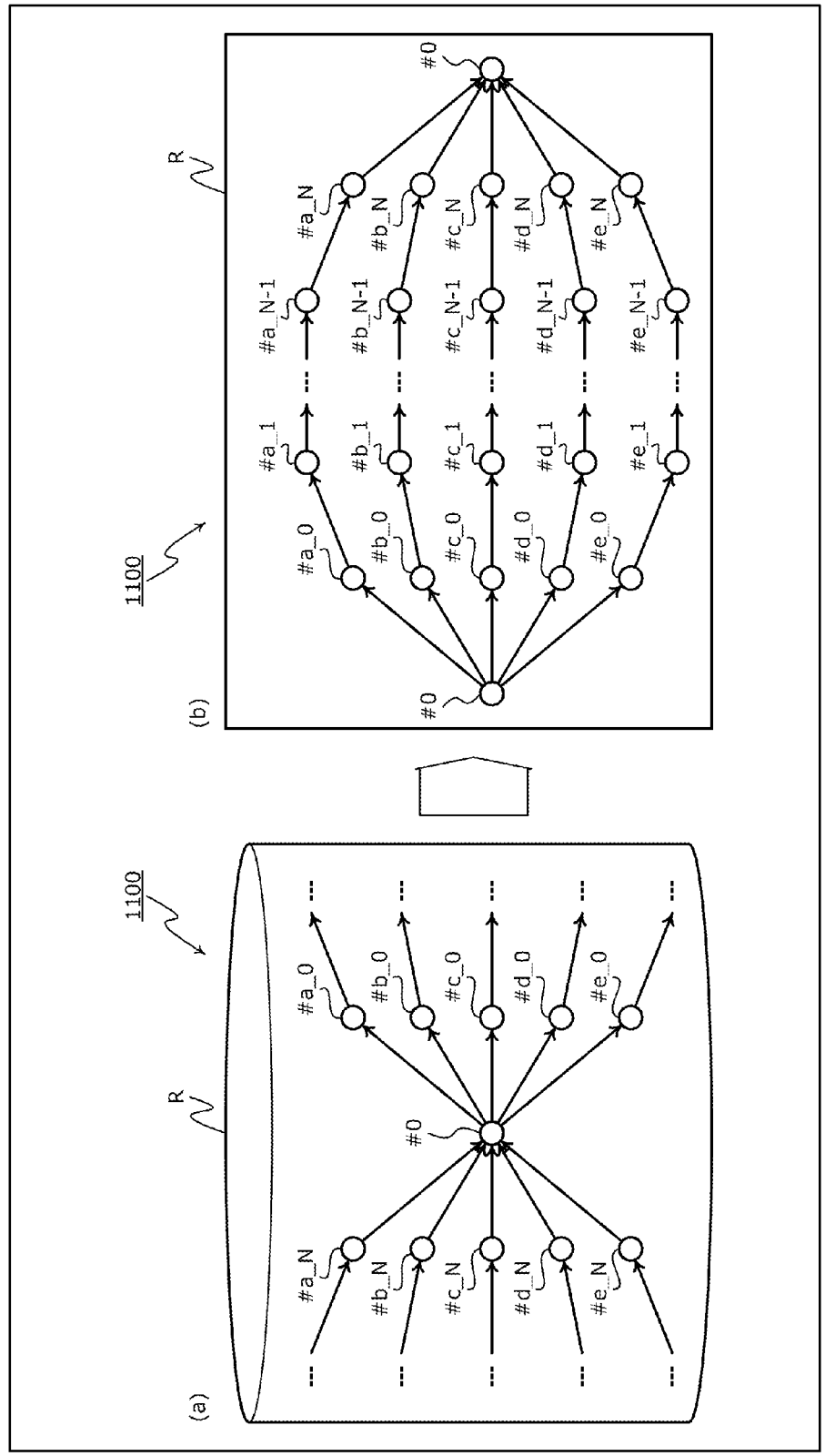
FIG. 11 is a diagram depicting an operation example of the distributed processing method according to a second embodiment.

FIG. 11 is a diagram depicting an operation example of the distributed processing method according to the second embodiment. As represented by reference character (a) in FIG. 11, the given area R in which the nodes included in the system 1100 according to the second embodiment are disposed forms the surface of a cylinder. As represented by reference character (a) in FIG. 11, there is 1 master, master #0. Further, the slaves include slaves #a_0 to #a_N, #b_0 to #b_N, #c_0 to #c_N, #d_0 to #d_N, and #e_0 to #e_N. Reference character (b) in FIG. 11 depicts the surface of the cylinder of reference character (a) in FIG. 11, expanded such that master #0 is the start and end of the communication paths. The specified communication paths represented by reference character (b) in FIG. 11 are assumed to be 5 in the description hereinafter.

The first communication path is a ring communication path configured by master #0, slave #a_0 to #a_N, and master #0. The second communication path is a ring communication path configured by master #0, slave #b_0 to #b_N, and master #0. The third communication path is a ring communication path configured by master #0, slave #c_0 to #c_N, and master #0. The fourth communication path is a ring communication path configured by master #0, slave #d_0 to #d_N, and master #0. The fifth communication path is a ring communication path configured by master #0, slave #e_0 to #e_N, and master #0.

In this manner, the communication paths represented by reference character (b) in FIG. 11 are ring communication paths having master #0 as an origin. Therefore, any one of the slaves excluding the master of the communication path determines whether the given period has elapsed.

Figure 12:
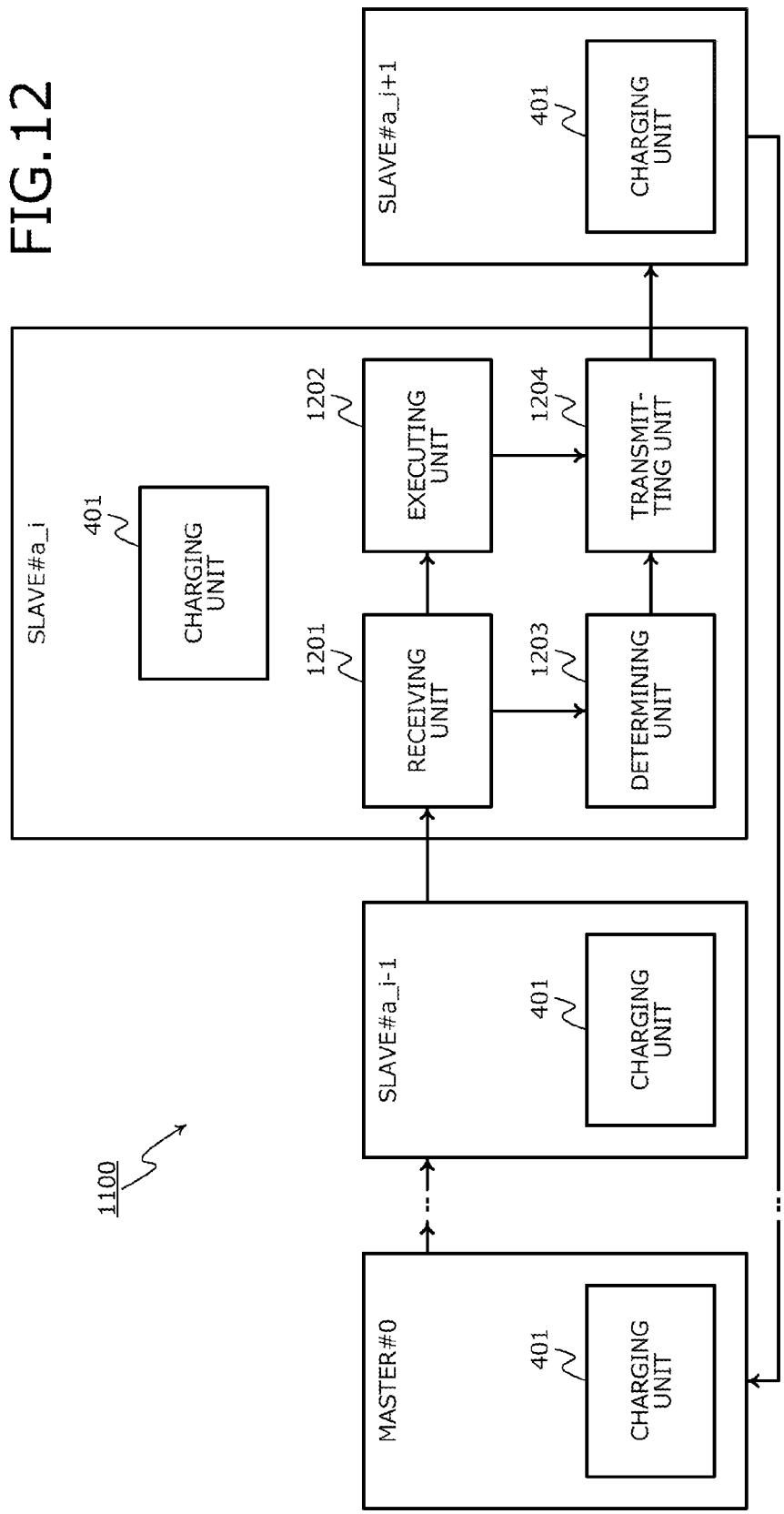
FIG. 12 is a block diagram depicting a functional example of the system according to the second embodiment

FIG. 12 is a block diagram depicting a functional example of the system according to the second embodiment. The system 1100 includes the charging unit 401, a receiving unit 1201, an executing unit 1202, a determining unit 1203, and a transmitting unit 1204. Functions of the receiving unit 1201 to the transmitting unit 1204 forming a control unit are realized by executing on the MCU 201, programs stored in a storage apparatus. The storage apparatus, more specifically, for example, is the ROM 205, the RAM 204, the non-volatile memory 206 depicted in FIG. 2, etc. The charging unit 401 is included in master #0, slave #a_i−1, slave #a_i, slave #a_i+1. Here, i is an integer that is 0 or more and less than a_N. The charging unit 401 corresponds to the battery 209 described with reference to FIG. 2. The receiving unit 1201 to the transmitting unit 1204 are included in slave #a_i.

The receiving unit 1201 receives from a first node capable of direct communication, a result of a first process executed by the node. When i is 1 or greater, the first node is slave #a_i−1. On the other hand, when i is 0, the first node is master #0. In this case, the first process is a generated process. The received result is stored to a storage area such as the RAM 204 and the non-volatile memory 206 of slave #a_i.

The executing unit 1202 executes the second process based on the result of the first process, if the receiving unit 1201 receives the result of the first process. The result of the executed process is stored to a storage area such as the RAM 204 and the non-volatile memory 206 of slave #a_i.

The determining unit 1203 determines whether the given period has elapsed since the reception of the result of the first process by the receiving unit 1201. The determination result is stored to a storage area such as the RAM 204 and the non-volatile memory 206 of slave #a_i.

The transmitting unit 1204 transmits the result of the second process to a second node capable of communicating directly with slave #a_i on the ring communication path, if the determining unit 1203 determines that the given period has elapsed. If i is less than N, the second node is slave #a_i+1. If i is N, the second node is master #0.

Figure 13:
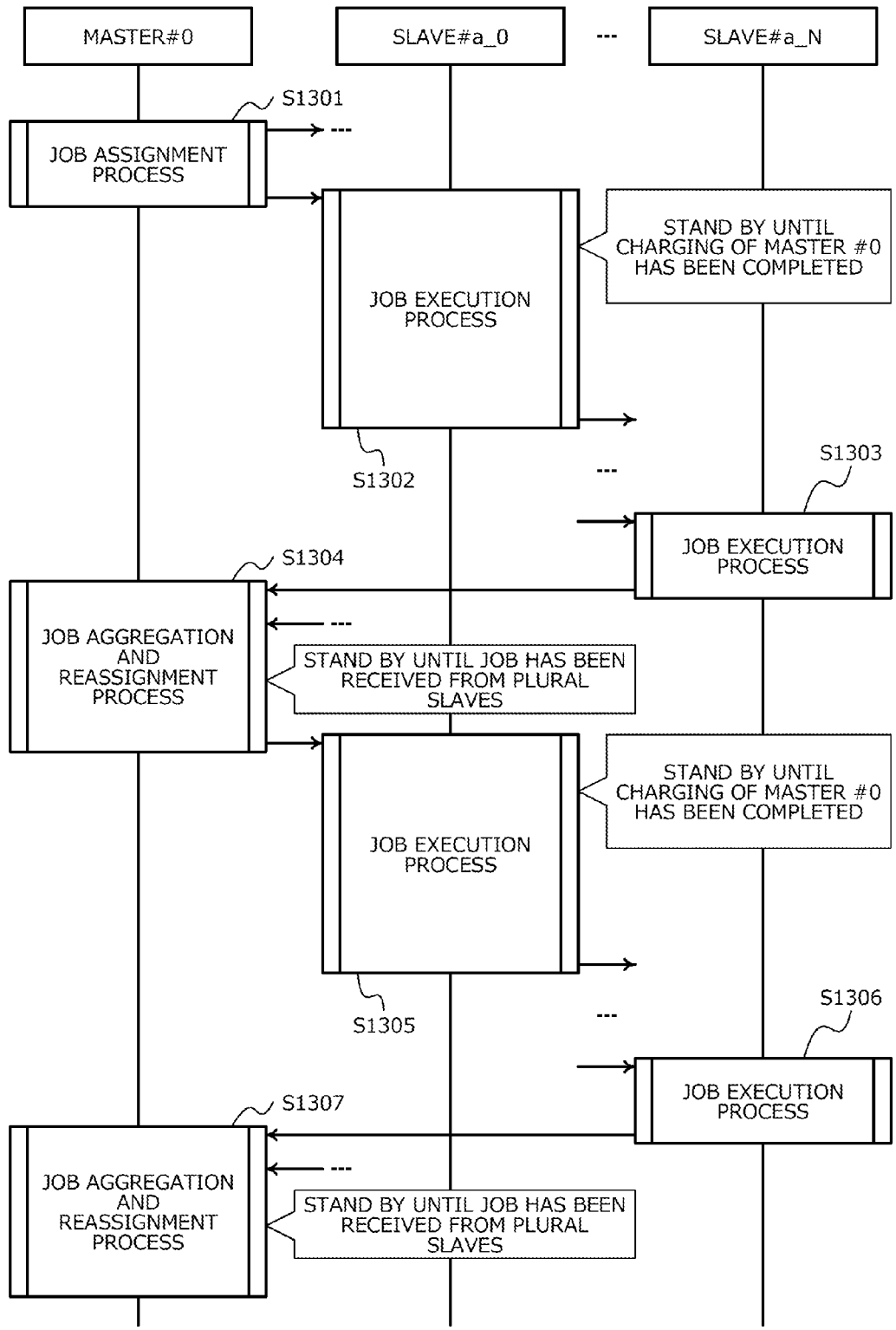
FIG. 13 is a diagram depicting a sequence of distributed processing by the nodes according to the second embodiment.

FIG. 13 is a diagram depicting a sequence of distributed processing by the nodes according to the second embodiment. In the example depicted in FIG. 13, distributed processing on a ring communication path configured by master #0, slave #a_0, slave #a_1, . . . , slave #a_N−1, slave #a_N, and master #0 will be described.

Master #0 executes the job assignment process according to the second embodiment (step S1301). Details of the job assignment process according to the second embodiment will be described with reference to FIG. 15. In the job assignment process, master #0 transmits a job to plural slaves that include slave #a_0. After the transmission, master #0 has consumed power and therefore, suspends operation.

Having received the job, slave #a_0 executes the job execution process according to the second embodiment (step S1302). Details of the job execution process according to the second embodiment will be described with reference to FIG. 16. The job execution process according to the second embodiment is put on hold until charging of master #0 has been completed, if the job is the first to be executed. Further, the node that stands by until charging of the master #0 has been completed may be any one of the nodes among slaves #a_0 to #a_N.

During the job execution process, slave #a_0 transfers the job to the subsequent slave. After the transfer, slave #0 has consumed power and therefore, suspends operation. In this manner, the job is successively transferred. Upon receiving the job, slave #a_N executes the job execution process (step S1303). In the job execution process, slave #a_N transfers the job to master #0. After the transfer, slave #a_N has consumed power and therefore, suspends operation.

Having received the job, master #0 executes the job aggregation and reassignment process according to the second embodiment (step S1304). Master #0 receives the job from the plural slaves including slave #a_N. Details of the job aggregation and reassignment process according to the second embodiment will be described with reference to FIG. 17. The job aggregation and reassignment process according to the second embodiment is put on hold until the job is received from plural slaves, and collects the jobs received from the slaves. When job reassignment is performed, the job aggregation and reassignment process according to the second embodiment generates a new job and assigns the new job to plural slaves.

In the job aggregation and reassignment process, master #0 transmits the new job to plural slaves including slave #a_0. When the new job is transmitted, charging of master #0 has been completed and therefore, there is a high likelihood that the charging of slave #a_0 has also been completed. After the transmission, master #0 has consumed power and therefore, suspends operation.

Having received the new job, slave #a_0 executes the job execution process according to the second embodiment (step S1305). The job execution process according to the second embodiment is put on hold until the charging of master #0 has been completed, if the new job is being executed for the first time. In the job execution process, slave #a_0 transfers the new job to the subsequent slave. After the transfer, slave #a_0 has consumed power and therefore, suspends operation. In this manner, the new job is successively transferred. Upon receiving the new job, slave #a_N executes the job execution process (step S1306). In the job execution process, slave #a_N transfers the new job to master #0. After the transfer, slave #a_N has consumed power and therefore, suspends operation.

Having received the new job, master #0 executes the job aggregation and reassignment process according to the second embodiment (step S1307). Master #0 receives the new job from the plural slaves including slave #a_N. Master #0, in the job aggregation and reassignment process according to the second embodiment, stands by until the job has been received from plural slaves, and collects the jobs received from the plural slaves. A job structure according to the second embodiment and describing information included in a job will be described with reference to FIG. 14.

Figures 14, 15:
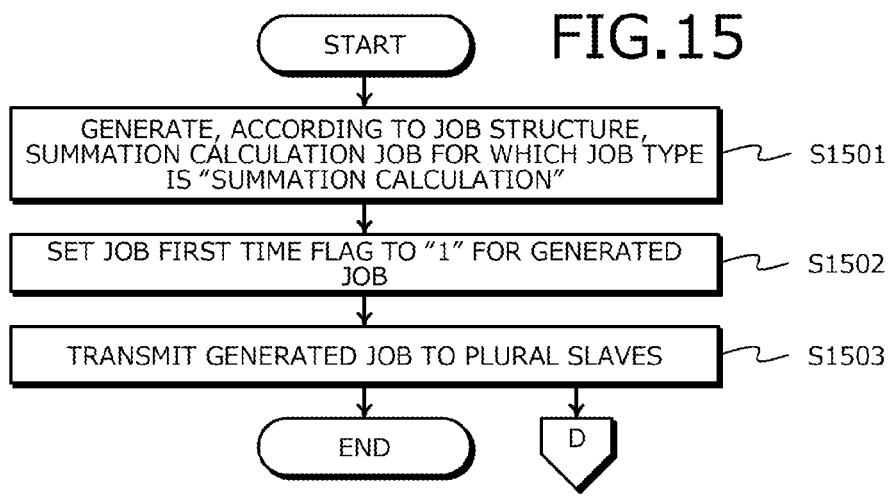
FIG. 14 is a diagram depicting an example of the job structure according to the second embodiment.
FIG. 15 is a flowchart depicting an example of a procedure of the job assignment process according to the second embodiment.

FIG. 14 is a diagram depicting an example of the job structure according to the second embodiment. A job structure 1401 is program code defining information included in a job according to the second embodiment. In addition to the 4 members included in the job structure 601, the job structure 1401 includes a job first time member storing a first time flag indicating whether the job is being executed for the first time in the system. Hereinafter, to simplify description, data stored in the job first time member will be referred to as "first time flag" of a job. When the first time flag according to the second embodiment is "1", the job is being executed for the first time and when the first time flag according to the second embodiment is "0", the job has been executed by another node.

Flowcharts of the job assignment process, the job execution process, and the job aggregation and reassignment process depicted in FIG. 13 will be described with reference to FIGS. 15 to 17.

FIG. 15 is a flowchart depicting an example of a procedure of the job assignment process according to the second embodiment. The job assignment process according to the second embodiment is a process of assigning a job to plural slaves. Master #0 generates according to the job structure 1401, a summation calculation job for which the job type is "summation calculation" (step S1501). Master #0 sets the job first time flag to "1" for the generated summation calculation job (step S1502). Subsequently, master #0 transmits the generated job to plural slaves (step S1503). After completing the operation at step S1503, master #0 ends the job assignment process according to the second embodiment. By executing the job assignment process according to the second embodiment, master #0 can assign a job to plural slaves.

Figure 16:
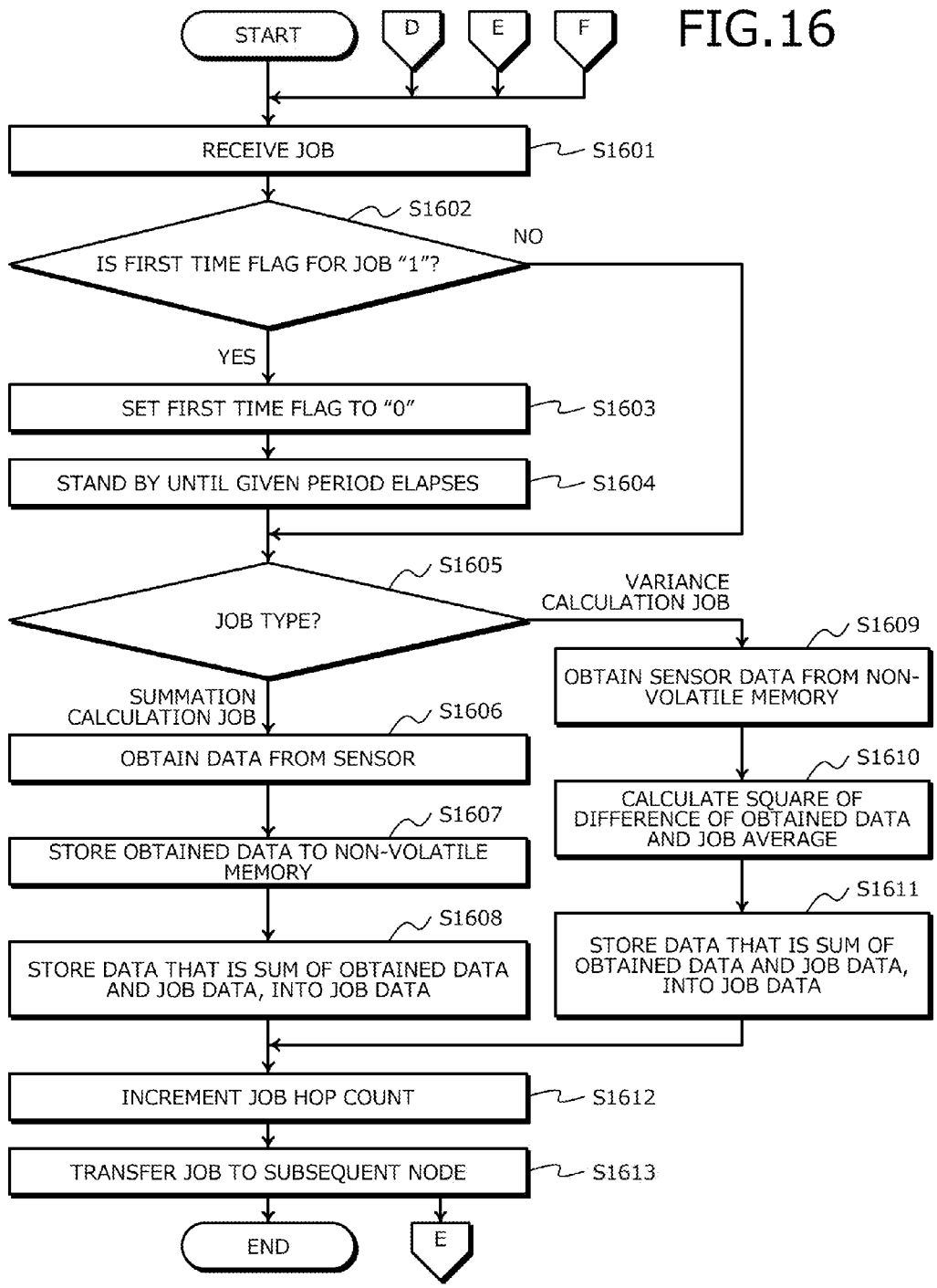
FIG. 16 is a flowchart depicting an example of a procedure of the job execution process according to the second embodiment.

FIG. 16 is a flowchart depicting an example of a procedure of the job execution process according to the second embodiment. The job execution process according to the second embodiment is a process of executing an assigned job. The job execution process according to the second embodiment is executed by the slaves. With reference to FIG. 16, description will be given for a case where any one of the slaves among the plural slaves executes the job execution process.

When any one of the following 3 conditions is satisfied, the slave is triggered to execute the job execution process. The first condition is represented by flowchart connector D in FIG. 16, and is a case where the slave is the subsequent node of master #0 and the operation at step S1503 in FIG. 15 has been executed. The second condition is represented by flowchart connector E in FIG. 16, and is a case where the slave is the subsequent node of another slave, the job execution process has been executed by the other slave, and the operation at step S1613 in FIG. 16 has been executed. The third condition is represented by flowchart connector F in FIG. 16, and is a case where the slave is the subsequent node of master #0 and the operation at step S1708 in FIG. 17 has been executed.

The operations at step S1601 and steps S1605 to S1613 of the job execution process according to the second embodiment are identical to the operations at steps S801 to S810 in FIG. 8 and therefore, description thereof is omitted herein.

After completing the operation at step S1601, the slave determines whether the first time flag for the job is "1" (step S1602). If the first time flag is "1" (step S1602: YES), the slave sets the first time flag to "0" (step S1603). The slave stands by until the given period elapses (step S1604). The slave may execute operations up to and including that at step S1612 while standing by.

After completing the operation at step S1604 or if the first time flag is "0" (step S1602: NO), the slave transitions to the operation at step S1605. By executing the job execution process according to the second embodiment, the slaves can execute an assigned job and since the slaves standby until master #0 is sufficiently charged, the job can be transmitted when master #0 is operating.

FIG. 17 is a flowchart depicting an example of a procedure of the job aggregation and reassignment process according to the second embodiment. The job aggregation and reassignment process according to the second embodiment is put on hold until the job is received from plural slaves, collects the job received from the plural slaves, and when job reassignment is to be performed, generates a new job and assigns the new job to the plural slaves. The trigger for the execution of the job aggregation and reassignment process according to the second embodiment is a case where the operation at step S1613 has been executed by a slave whose subsequent node is master #0.

Further, the operations at steps S1704 to S1706, and step S1708 of the job aggregation and reassignment process according to the second embodiment are identical to the operations at steps S903 to S906 depicted in FIG. 9 and therefore, description thereof is omitted herein.

Master #0 receives a job (step S1701). Subsequently, master #0 determines whether the maximum reception standby period has elapsed since the first reception of the job (step S1702). If the maximum reception standby period has not elapsed since the first reception of the job (step S1702: NO), master #0 transitions to the operation at step S1701.

If the maximum reception standby period has elapsed since the first reception of the job (step S1702: YES), master #0 confirms the job type (step S1703). If the job type is a summation calculation job (step S1703: summation calculation job), master #0 transitions to the operation at step S1704.

After completing the operation at step S1706, master #0 sets the job first time flag to "1" (step S1707) and transitions to the operation at step S1708.

If the job type is a variance calculation job (step S1703: variance calculation job), master #0 calculates sample variance from the received job data and hop counts (step S1709). The value of the sample variance is stored to the non-volatile memory 304. After completing the operation at step S1709, master #0 ends the job aggregation and reassignment process according to the second embodiment. By executing the job aggregation and reassignment process according to the second embodiment, the system 1100 can aggregate results of a job that is distributed and executed.

As described, according to the system 1100, when plural nodes configure a ring communication path, by having slaves subsequent to master #0 standby for a given period, process results can be transmitted while master #0 is operating.

The distributed processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The distributed processing program may be distributed through a network such as the Internet.

According to one aspect of the present disclosure, an effect is achieved in that distributed processing can be efficiently performed using plural communications apparatuses that operate using power generated from energy obtained corresponding to the environment.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A distributed processing method of a system in which a plurality of communications apparatuses transmits and receives data by multi-hop communication, the distributed processing method comprising:

executing, by a given communications apparatus being among the plurality of communications apparatuses, a given calculation process that is a different kind of calculation process from a first calculation process, based on a result of the first calculation process executed by a first communications apparatus that is among the plurality of communications apparatuses, communicates directly with the given communications apparatus, and operates using power stored in a charging device charged by power generated from energy obtained corresponding to an environment where the first communications apparatus is installed, the given communications apparatus executing the given calculation process when receiving the result of the first calculation process from the first communications apparatus;

determining, by the given communications apparatus, whether a given period has elapsed since receiving the result of the first calculation process;

transmitting, by the given communications apparatus, a result of the given calculation process to the first communications apparatus when determining that the given period has elapsed; and assigning, by the given communications apparatus, a second calculation process that is a different kind of calculation process from the first and the given calculation processes to the first communications apparatus when determining that the given period has elapsed.

2. The distributed processing method according to claim 1, wherein when the given communications apparatus receives the result of a third calculation process that is a same kind of calculation process as the first calculation process, from a second communications apparatus before the given communications apparatus determines that the given period has elapsed, the second communications apparatus having executed the third calculation process, being among the plurality of communications apparatuses excluding the first communications apparatus, communicating directly with the given communications apparatus, and operating using power stored in a charging device charged by power generated from energy obtained corresponding to an environment where the second communications apparatus is installed, the distributed processing method comprising:
 executing, by the given communications apparatus, the given calculation process based on the result of the first calculation process and the result of the third calculation process,
 determining, by the given communications apparatus, whether the given period has elapsed since receiving the result of the third calculation process from the second communications apparatus, and
 transmitting, by the given communications apparatus, the result of the given calculation process to the first communications apparatus and the second communications apparatus, when determining that the given period has elapsed.

3. A distributed processing method of a system in which a plurality of communications apparatuses transmits and receives data by multi-hop communication, the distributed processing method comprising:
 executing, by a communications apparatus, a second calculation process based on a result of a first calculation process, when receiving the result of the first calculation process from a first communications apparatus that executed the first calculation process and communicates directly with the communications apparatus on a ring communication path formed by the plurality of communications apparatuses respectively operating using power of a charging device charged by power generated from energy obtained corresponding to an environment where installed, the communications apparatus being among the plurality of communications apparatuses and specified as an origin on the ring communication path, the second calculation process being different kind of calculation process from the first calculation process;
 determining, by the communications apparatus, whether a given period has elapsed since receiving the result of the first calculation process;
 transmitting, by the communications apparatus, a result of the second calculation process to a second communications apparatus that on the ring communications path, communicates directly with the communications apparatus, the communications apparatus transmitting the result of the second calculation process when determining that the given period has elapsed; and
 assigning, by the communications apparatus, a third calculation process that is different kind of calculation process from the first and the second calculation process to the second communications apparatus when determining that the given period has elapsed.

4. A system in which a plurality of communications apparatuses transmits and receives data by multi-hop communication, the system comprising
 a given communications apparatus that is among the plurality of communications apparatuses and configured to include:
  an executing circuit configured to execute a given calculation process that is a different kind of calculation process from a first calculation process, based on a result of the first calculation process executed by a communications apparatus that is among the plurality of communications apparatuses, communicates directly with the given communications apparatus, and operates using power stored in a charging device charged by power generated from energy obtained corresponding to an environment where the communications apparatus is installed, the executing circuit executing the given calculation process when the given communications apparatus receives the result of the first calculation process from the communications apparatus;
  a determining circuit configured to determine whether a given period has elapsed since reception of the result of the first calculation process;
  a transmitting circuit configured to transmit a result of the given calculation process executed by the executing circuit, to the communications apparatus when the determining circuit determines that the given period has elapsed; and
  an assigning circuit configured to assign a third calculation process that is a different kind of calculation process from the first and the given calculation processes to the first communications apparatus when determining that the given period has elapsed.

5. A system in which a plurality of communications apparatuses transmits and receives data by multi-hop communication, the system comprising
 a communications apparatus that is among the plurality of communications apparatuses and specified as an origin on a ring path formed by the plurality communications apparatuses respectively operating using power of a charging device charged by power generated from energy obtained corresponding to an environment where installed, the communications apparatus configured to include:
  an executing circuit configured to execute a second calculation process based on a result of a first calculation process, when the communications apparatus receives the result of the first calculation process from a first communications apparatus that executed the first calculation process and that communicates directly with the communications apparatus on the ring communication path, the second calculation process being different kind of calculation process from the first calculation process;
  a determining circuit configured to determine whether a given period has elapsed since reception of the result of the first calculation process;
  a transmitting circuit configured to transmit a result of the second calculation process executed by the executing circuit, to a second communications apparatus that on the ring communication path, communicates directly with the communications apparatus, the transmitting circuit transmitting the result of the second calculation process when the determining circuit determines that the given period has elapsed; and
  an assigning circuit configured to assign a third calculation process that is a different kind of calculation process from the first and the second calculation processes to the first communications apparatus when determining that the given period has elapsed.

6. A non-transitory, computer-readable recording medium storing therein a distributed processing program of a system in which a plurality of communications apparatuses transmits and receives data by multi-hop communication, the distributed processing program causing a given communications apparatus among the plurality of communications apparatuses to execute a process comprising:

executing a given calculation process that is a different kind of calculation process from a first calculation process, based on a result of the first calculation process executed by a communications apparatus that is among the plurality of communications apparatuses, communicates directly with the given communications apparatus, and operates using power stored in a charging device charge by power generated from energy obtained corresponding to an environment where the communications apparatus is installed, the given calculation process being executed when the given communications apparatus receives the result of the first calculation process from the communications apparatus;

determining whether a given period has elapsed since reception of the result of the first calculation process; and transmitting a result of the given calculation process to the communications apparatus, when determining that the given period has elapsed; and assigning a second calculation process that is a different kind of calculation process from the first and the given calculation processes to the first communications apparatus when determining that the given period has elapsed.

7. A non-transitory, computer-readable recording medium storing therein a distributed processing program of a system in which a plurality of communications apparatuses transmits and receives data by multi-hop communication, the distributed processing program causing a communications apparatus among the plurality of communications apparatuses to execute a process comprising:

executing a second calculation process based on a result of a first calculation process, when the communications apparatus receives the result of the first calculation process from a first communications apparatus that executed the first calculation process and communicates directly with the communications apparatus on a ring communication path formed by the plurality communications apparatuses respectively operating using power of a charging device charged by power generated from energy obtained corresponding to an environment where installed, the communications apparatus being among the plurality of communications apparatuses and specified as an origin on the ring path, the second calculation process being different kind of calculation process from the first calculation process;

determining whether a given period has elapsed since reception of the result of the first calculation process; and transmitting a result of the second calculation process to a second communications apparatus that on the ring communication path, communicates directly with the communications apparatus, the result of the second calculation process being transmitted when determining that the given period has elapsed; and assigning a third calculation process that is different kind of calculation process from the first and the second calculation process to the second communications apparatus when determining that the given period has elapsed.

* * * * *